UNITED STATES PATENT OFFICE.

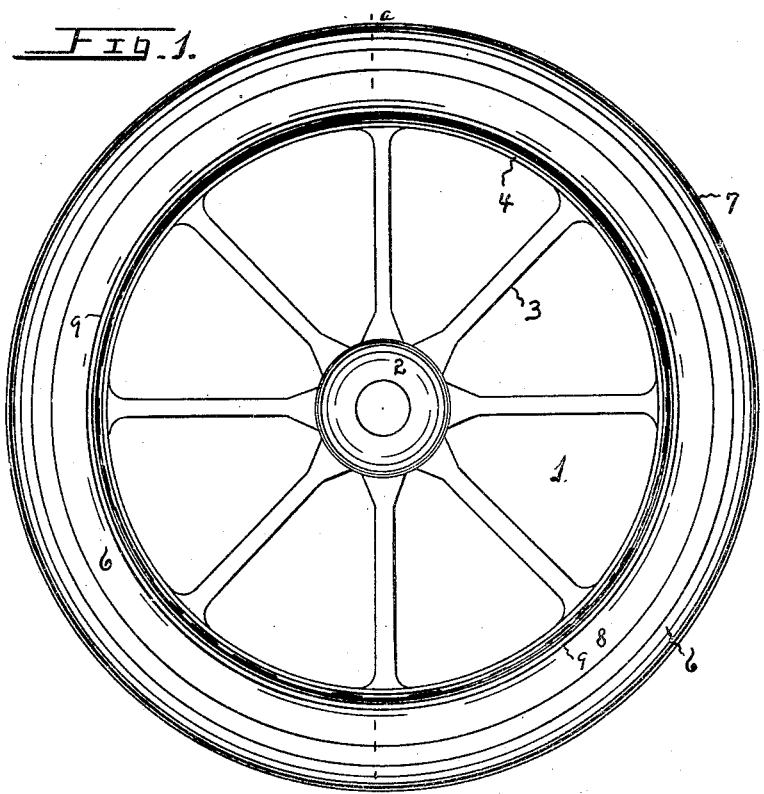
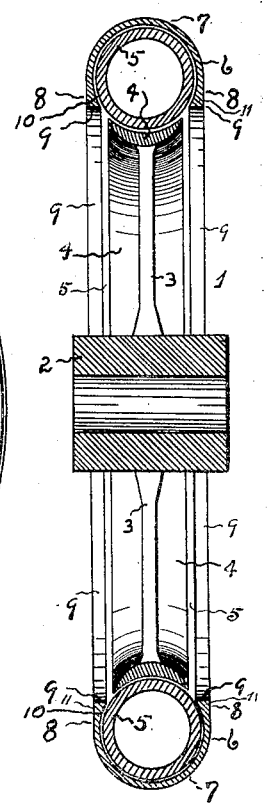
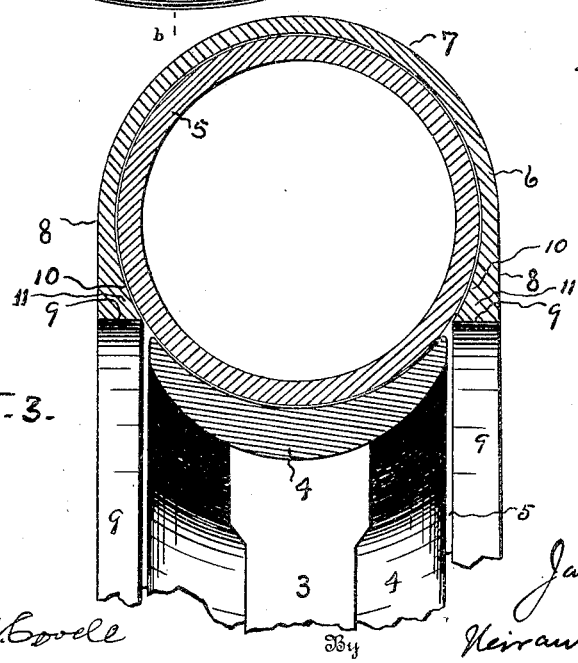
J. BOWIE.
TIRE JACKET FOR VEHICLE WHEELS.
APPLICATION FILED MAR. 30, 1908.
902,551.   Patented Nov. 3, 1908.

JAMES BOWIE, OF OMAHA, NEBRASKA.

TIRE-JACKET FOR VEHICLE-WHEELS.

No. 902,551.

Specification of Letters Patent.

Patented Nov. 3, 1908.

Application filed March 30, 1908. Serial No. 424,091.

*To all whom it may concern:*

Be it known that I, JAMES BOWIE, a citizen of the United States, residing at Omaha, in the county of Douglas and State of Nebraska, have invented certain new and useful Improvements in Tire-Jackets for Vehicle-Wheels, of which the following is a specification.

This invention relates to improvements in tire jackets for vehicle wheels, and is designed more particularly for use in connection with automobiles.

One object of the invention is the provision of a means for protecting inflated rubber tires to prevent the wear or puncturing incident to their use, and without materially diminishing their resiliency.

Another object is the furnishing of a housing for the entire outer surface, substantially, of the rubber tire, that its weaker portions may have a uniform bearing or support, to prevent "blow outs" or explosions of the tire.

The invention shows the use of a light jacket, preferably of metal, which may be constructed at slight comparative cost, and which will be a substitute, indirectly, for the expensive rubber tread in general use.

The invention has reference to certain structural features, which include an integral jacket, economical in manufacture, which may be quickly adjusted in operative position, and which has an inner surface conforming to the shape of the rubber tire, whereby the wall of the tire, when inflated, may have an adequate and uniform support.

With these and other objects in view, the invention presents a new combination and arrangement of parts, as described herein, pointed out by the claim, and as illustrated by the drawing, wherein,—

Figure 1 is a side view of a vehicle wheel with a jacket mounted thereon, embodying my invention. Fig. 2 is a sectional view on line $a$ $b$ of Fig. 1. Fig. 3 is an enlarged, broken away detail, relating to Fig. 2.

Referring now to the drawing for a more particular description, numeral 1 indicates a vehicle wheel; numerals 2 and 3 indicate, respectively, the hub and spokes of the wheel, and at 4 is shown the rim secured upon the outer terminals of the spokes for the support of rubber tire 5.

For purposes of the invention I form a circular jacket 6 as an integral structure, having at and adjacent its periphery a transversely curved area to form a convexed outer surface or tread 7 extending, in cross-section, substantially 180 degrees, and of a uniform thickness, the wall of the jacket being extended inwardly to form upon its outer surface the parallel sides 8 terminating with the transverse facing-rim 9, this rim being disposed, substantially, at a right angle to sides 8 and having a width very much in excess of the thickness of the wall of the tread, and thereby providing for the inner surfaces 10 of the jacket, said surfaces extending from rim 9 convergently with reference to parallel sides 8. As thus described, the inner surface of tread 7 furnishes a rigid housing-wall against which tire 5 is forced, when inflated, and, as is obvious, the pressure thereon will be uniform; and in operation, a rubber tire having imperfections in its wall which ordinarily might result in punctures or a "blow out", will, when placed in the jacket, be supported adequately by the inner surface of the tread, and such defective tire may thereafter be used and will be securely protected in the jacket and utilized an indefinite period of time; and old tires which have abrasions on their surfaces may be utilized, and when seated in this jacket, will be protected, since they are pressed uniformly against the wall of the inner tread.

Walls 8 are preferably formed parallel and are parallel with the longitudinal plane of the wheel, and thereby they are not obtrusive to encounter obstacles when the vehicle is being driven about; also, in combination with the facing-rim 9 and convergently formed wall 10, this construction forms thickened terminals or bases 11, which materially adds strength to the structure.

The function discharged by the convergently formed wall 10 is to furnish a rigid bearing which conforms to the shape of the rubber tire, and which supports the wall of the inflated tire for preventing "blow outs" which might occur from imperfections in the adjacent wall of the tire, this being a similar function already described in connection with the inner wall of the tread.

It will be understood that when considering the diameter of the wheel, the distance apart of facing-rims 9 is slightly greater than that of supporting-rim 4; the rubber tire, before being inflated, is placed within the jacket, and the supporting-rim is adapted to have a seating adjacent and to occupy a space between the planes of facing-rims 9 of the jacket, and when the tire is inflated, practically its entire wall is protected and rigidly supported. The device thus described may be very economically cast as an integral, metal jacket, and should be provided with a rugose wearing surface to contact with icy pavements or other smooth surfaces when the wheel is in use, this feature not being shown in the drawing.

Having fully described my invention, what I claim and desire to secure by Letters Patent, is,—

A jacket for rubber tires comprising an annular concavo-convex ring the inner face of which rests directly against the face of the rubber tire, said ring extending more than half way around said tire and the edges of said ring terminating in thickened portions, the inner faces of said thickened portions bearing against the tire and the outer faces presenting vertical walls.

In testimony whereof I have affixed my signature in presence of two witnesses.

JAMES BOWIE.

Witnesses:
JESSIE A. FRAHM,
HIRAM A. STURGES.